(12) United States Patent
Oshima et al.

(10) Patent No.: US 10,513,160 B2
(45) Date of Patent: Dec. 24, 2019

(54) AMPHIBIOUS VEHICLE

(71) Applicant: MITSUBISHI HEAVY INDUSTRIES, LTD., Tokyo (JP)

(72) Inventors: Takaaki Oshima, Tokyo (JP); Satoru Ishikawa, Tokyo (JP); Takashi Matsunaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/521,966

(22) PCT Filed: Oct. 27, 2015

(86) PCT No.: PCT/JP2015/080223
§ 371 (c)(1),
(2) Date: Apr. 26, 2017

(87) PCT Pub. No.: WO2016/068121
PCT Pub. Date: May 6, 2016

(65) Prior Publication Data
US 2017/0326932 A1 Nov. 16, 2017

(30) Foreign Application Priority Data
Oct. 30, 2014 (JP) .................. 2014-221351

(51) Int. Cl.
*B60F 3/00* (2006.01)
*B63H 25/44* (2006.01)

(52) U.S. Cl.
CPC .......... *B60F 3/0007* (2013.01); *B60F 3/0038* (2013.01); *B63H 25/44* (2013.01)

(58) Field of Classification Search
CPC ....... B60F 3/0007; B60F 3/0038; B63H 25/44
See application file for complete search history.

(56) References Cited

U.S. PATENT DOCUMENTS 3,399,643 A      9/1968   Bennett
4,953,492 A  *   9/1990   Duffty ................... B60F 3/0007
                                                      114/282

(Continued)

FOREIGN PATENT DOCUMENTS

GB           2461957 A       1/2010
JP       2003-291801 A      10/2003

(Continued)

OTHER PUBLICATIONS

English translation of the Written Opinion of the International Searching Authority (Form PCT/ISA/237), dated Jan. 12, 2016, for International Application No. PCT/JP2015/080223.

(Continued)

*Primary Examiner* — Anthony D Wiest
(74) *Attorney, Agent, or Firm* — Birch, Stewart, Kolasch & Birch, LLP

(57) ABSTRACT

An amphibious vehicle, which enables wave making resistance upon traveling on water to be reduced and propulsive performance of its vehicle main body to be improved, is to be provided. An amphibious vehicle of the present invention includes: a vehicle main body that is movable on water and on land; a rear portion flap having a front end portion fixed to a rear portion of the vehicle main body; and end plates respectively provided at both side end portions of the rear portion flap.

15 Claims, 14 Drawing Sheets

(56) References Cited

U.S. PATENT DOCUMENTS

| | | | |
|---|---|---|---|
| 5,474,013 A | 12/1995 | Wittmäier | |
| 5,579,711 A * | 12/1996 | Thomas | B63B 39/061 |
| | | | 114/285 |
| 5,765,497 A * | 6/1998 | Thomas | B60F 3/0046 |
| | | | 440/12.5 |
| 7,530,866 B2 * | 5/2009 | Darby | B60F 3/0038 |
| | | | 114/285 |
| 2005/0239351 A1 | 10/2005 | Darby et al. | |
| 2014/0150704 A1 | 6/2014 | Petromanolakis et al. | |

FOREIGN PATENT DOCUMENTS

| | | |
|---|---|---|
| JP | 2006-525918 A | 11/2006 |
| JP | 2013-147088 A | 8/2013 |
| JP | 2013-154794 A | 8/2013 |
| JP | 2014-522778 A | 9/2014 |

OTHER PUBLICATIONS

International Search Report, issued in PCT/JP2015/080223 (PCT/ISA/210), dated Jan. 12, 2016.
Written Opinion of the International Searching Authority, issued in PCT/JP2015/080223 (PCT/ISA/237), dated Jan. 12, 2016.
Office Action dated Sep. 11, 2018 in corresponding Japanese Patent Application No. 2014-221351 with an English Translation.

* cited by examiner

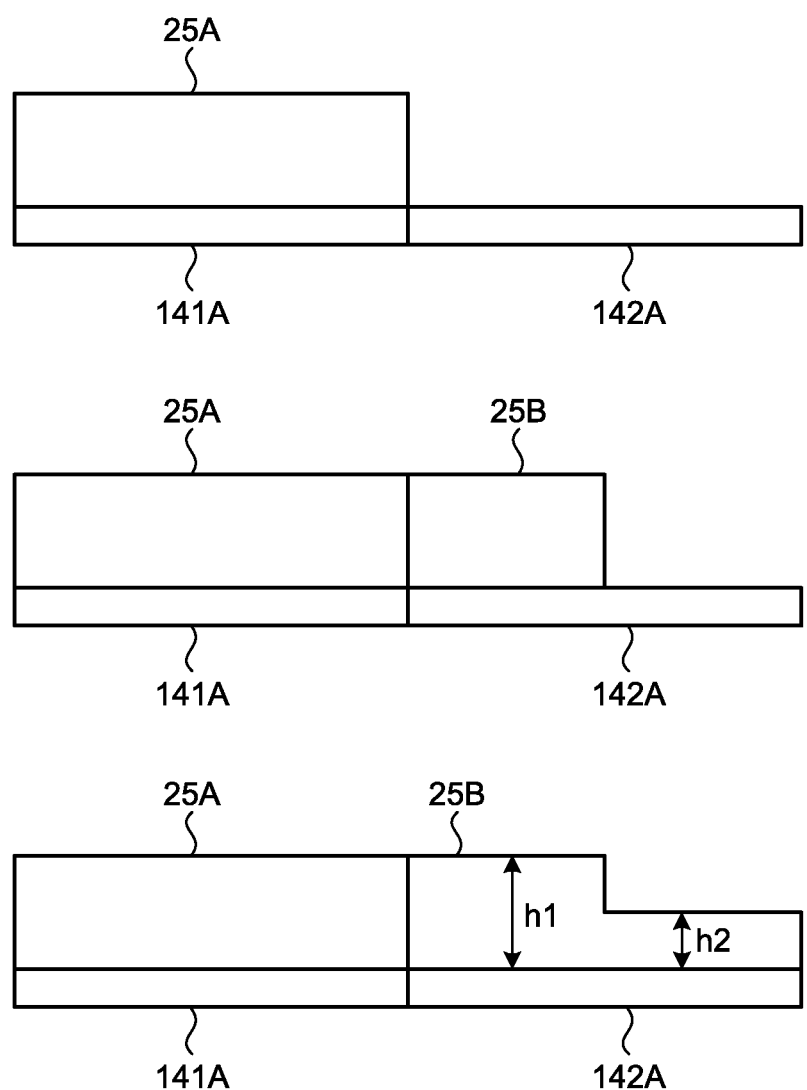

AMPHIBIOUS VEHICLE

FIELD

The present invention relates to an amphibious vehicle, and relates to, for example, an amphibious vehicle having a plate shaped member provided at a rear portion of the vehicle.

BACKGROUND

Conventionally, air cushion vehicles having automatic ground surface following partition plates have been proposed (for example, see Patent Literature 1). Such an air cushion vehicle has a movable plate attached to a fixing plate via a guide rail, the fixing plate being attached downward from a body of the air cushion vehicle. The air cushion vehicle has a wing end plate provided at a small wing which is provided at a lower end of the movable plate. Thereby, in this air cushion vehicle, even if a ground surface is not flat, an air cushion is efficiently generated due to lifting force provided by the small wing, and resistance due to swirls and resistance due to contact with the ground surface are reduced.

Further, an amphibious vehicle having a wheel side surface cover (for example, see Patent Literature 2), and an amphibious vehicle having a side surface vertical plate (for example, see Patent Literature 3) have been proposed. In these amphibious vehicles, the wheel side surface cover or the side surface vertical plate, which is provided to cover the wheels, prevents foreign matter from going into the vehicle main body from a side surface of the vehicle.

CITATION LIST

Patent Literature

Patent Literature 1: Japanese Unexamined Patent Application, Publication No. 2003-291801
Patent Literature 2: Japanese Unexamined Patent Application, Publication No. 2013-147088
Patent Literature 3: Japanese Unexamined Patent Application, Publication No. 2013-154794

SUMMARY

Technical Problem

For amphibious vehicles, investigations have been made for improving their propulsive performance upon traveling on water by providing flaps at the front and the rear of the vehicles. However, when the vehicles travel at high speeds on water (for example, at 14 km/h or more), for example, even if the flaps are provided at the front and the rear of the vehicles, swirls are generated by water that enters from both sides of the flaps to a position between the vehicle main bodies and the flaps. The wave making resistance acting on the vehicle bodies is increased due to the generated swirls, and thus sufficient propulsive performance upon traveling on water may be not necessarily obtained.

The present invention has been made in view of the above circumstances, and an object thereof is to provide an amphibious vehicle that enables wave making resistance upon traveling on water to be reduced, and propulsive performance of the vehicle main body to be improved.

Solution to Problem

An amphibious vehicle of this disclosure comprises: a vehicle main body that is movable on water and on land; a rear portion plate shaped member having a front end portion that is fixed to a rear portion of the vehicle main body; and rear portion end plates respectively provided at both side end portions of the rear portion plate shaped member.

According to this configuration, by the rear portion end plates provided at the rear portion plate shaped member, water entering the position between the rear portion end plates and the rear portion of the vehicle main body is able to be prevented, and thus generation of swirls at the rear side of the vehicle main body when the vehicle main body travels on water is able to be prevented. Thereby, since the amphibious vehicle enables wave making resistance upon traveling on water to be reduced, resistance acting on the vehicle main body is able to be reduced, and propulsive performance is able to be improved.

In the amphibious vehicle of this disclosure, the rear portion end plates are provided to stand downward from a lower surface of the rear portion plate shaped member. According to this configuration, in the amphibious vehicle, water flows via the space between the rear portion end plates and the rear portion plate shaped member upon traveling on water, and thus generation of swirls of water flow at both side end portions of the rear portion plate shaped member is able to be prevented, and wave making resistance upon traveling on water is able to be reduced. Further, since water pressure acting on the lower surface side of the rear portion plate shaped member is able to be increased, lifting force from the rear side of the vehicle is able to be improved, and posture of the vehicle upon traveling on water is able to be stabilized.

In the amphibious vehicle of this disclosure, the rear portion end plates are provided to stand upward from an upper surface of the rear portion plate shaped member. According to this configuration, in the amphibious vehicle, since water flows via the sides of the rear portion end plates upon traveling on water, water entering to the rear side of the vehicle is able to be prevented, generation of swirls of water flow at both side end portions of the rear portion plate shaped member is able to be prevented, and wave making resistance upon traveling on water is able to be reduced.

In the amphibious vehicle of this disclosure, the rear portion end plates include first rear portion end plates provided to stand downward from a lower surface of the rear portion plate shaped member, and second rear portion end plates provided to stand upward from an upper surface of the rear portion plate shaped member. According to this configuration, in the amphibious vehicle, since, due to the first rear portion end plates, water flows via the space between the rear portion end plates and the rear portion plate shaped member upon traveling on water, generation of swirls of water flow at both side end portions of the rear portion plate shaped member is able to be prevented, and wave making resistance upon traveling on water is able to be reduced. Further, since water pressure acting on the lower surface side of the rear portion plate shaped member is able to be increased by the first rear portion end plates, lifting force from the rear side of the vehicle is able to be improved, and posture of the vehicle upon traveling on water is able to be stabilized.

The amphibious vehicle of this disclosure further comprises: a front portion plate shaped member having a rear end portion that is fixed to a lower end portion of the vehicle main body; and front portion end plates respectively provided at both side end portions of the front portion plate shaped member. According to this configuration, in the amphibious vehicle, since water is able to be prevented from going to the front side of the vehicle main body, water flow at the rear side of the front portion plate shaped member upon traveling on water is able to be regulated, and wave making resistance is able to be reduced. Further, reduction of lifting force by the front portion plate shaped member is able to be prevented also.

In the amphibious vehicle of this disclosure, the front portion end plates are provided to stand upward from an upper surface of the front portion plate shaped member. According to this configuration, in the amphibious vehicle, since water is able to be prevented from going to the front side of the vehicle main body, water flow at the rear side of the front portion plate shaped member upon traveling on water is able to be regulated, and wave making resistance is able to be reduced. Further, reduction of lifting force by the front portion plate shaped member is able to be prevented.

In the amphibious vehicle of this disclosure, the front portion plate shaped member includes: a lower portion plate shaped member having a rear end portion that is fixed to a lower end portion of a front surface of the vehicle main body; and an upper portion plate shaped member at a front end portion of the lower portion plate shaped member, the upper portion plate shaped member being coupled turnably relative to the lower portion plate shaped member. According to this configuration, the angle between the lower portion plate shaped member and the upper portion plate shaped member of the front portion plate shaped member is able to be fixed arbitrarily.

In the amphibious vehicle of this disclosure, the front portion end plates include first front portion end plates that are provided at both side end portions of the upper portion plate shaped member, and second front portion end plates provided at both side end portions of the lower portion plate shaped member. According to this configuration, in the amphibious vehicle, since water is able to be prevented from going to the front side of the vehicle main body, water flow at the rear side of the front portion plate shaped member upon traveling on water is able to be regulated, and wave making resistance is able to be reduced. Further, reduction of lifting force by the upper portion plate shaped member and the lower portion plate shaped member of the front portion plate shaped member is able to be prevented.

In the amphibious vehicle of this disclosure, the front portion plate shaped member has a curved portion at the rear end portion of the front portion plate shaped member. According to this configuration, since the portion connecting between the front portion plate shaped member and the lower portion of the vehicle main body is able to be made smooth, water flow flowing at the lower surface side of the front portion plate shaped member is able to be regulated, and wave making resistance upon traveling on water is able to be reduced.

In the amphibious vehicle of this disclosure, the front portion plate shaped member is fixed to the vehicle main body turnably around a pivot that is a portion connecting the front portion plate shaped member to the vehicle main body. According to this configuration, in the amphibious vehicle, since the angle of the front portion plate shaped member becomes arbitrarily variable according to conditions upon traveling on water, wave making resistance upon traveling on water is able to be reduced.

In the amphibious vehicle of this disclosure, the rear portion plate shaped member is fixed to the vehicle main body turnably around a pivot that is a portion connecting the rear portion plate shaped member to the vehicle main body. According to this configuration, in the amphibious vehicle, since the angle of the rear portion plate shaped member becomes arbitrarily variable according to conditions upon traveling on water, wave making resistance upon traveling on water is able to be reduced.

In the amphibious vehicle of this disclosure, the front portion plate shaped member is fixable to a front surface of the vehicle main body. According to this configuration, in the amphibious vehicle, the front portion plate shaped member is able to be fixed compactly upon traveling on land.

In the amphibious vehicle of this disclosure, the rear portion plate shaped member is fixable to a rear surface of the vehicle main body. According to this configuration, in the amphibious vehicle, the rear portion plate shaped member is able to be fixed compactly upon traveling on land.

Advantageous Effects of Invention

According to the present invention, an amphibious vehicle, which enables wave making resistance upon traveling on water to be reduced, and propulsive performance of the vehicle main body to be improved, is able to be realized.

BRIEF DESCRIPTION OF DRAWINGS

FIG. 20 is a diagram illustrating the front portion flap and end plates, according to the fourth embodiment.

DESCRIPTION OF EMBODIMENTS

Hereinafter, embodiments of the present invention will be described in detail, with reference to the appended drawings. The present invention is not limited to the following embodiments, and may be implemented by modification of the embodiments, as appropriate. Further, the following embodiments may be implemented by being combined with one another, as appropriate. Furthermore, any component common to the respective embodiments will be appended with the same reference sign, and redundant description thereof will be avoided.

First Embodiment

Figure 1:
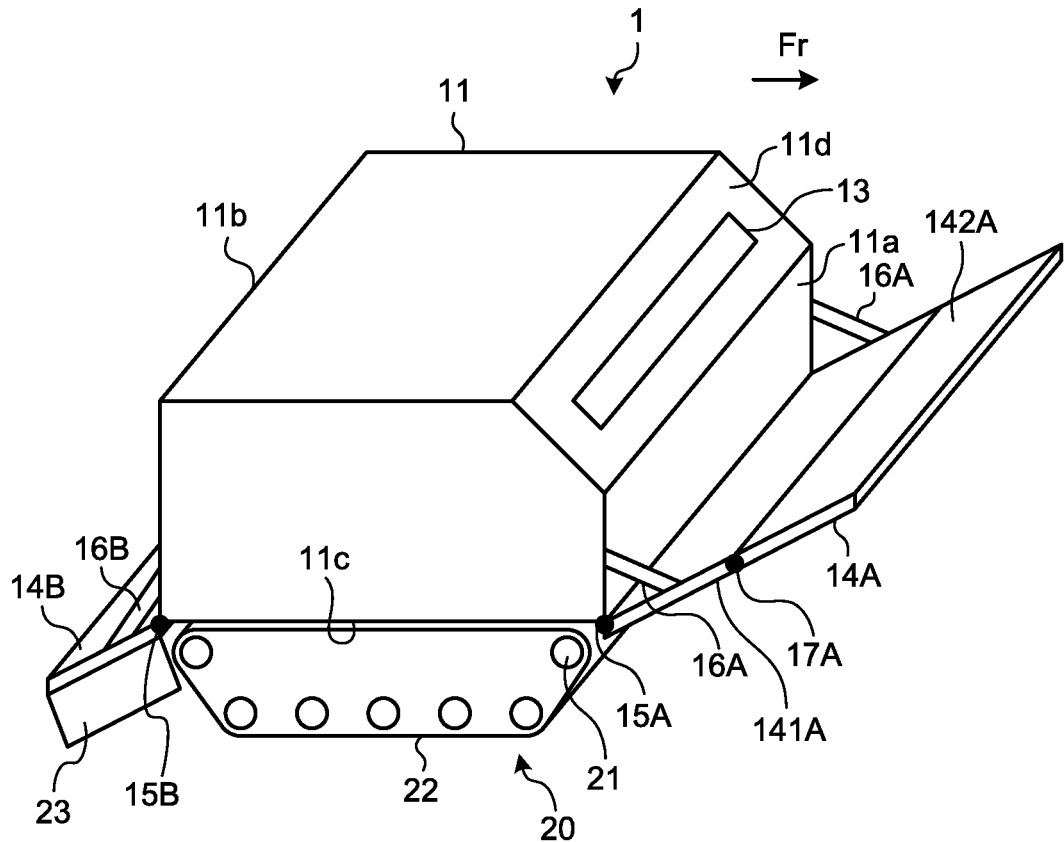
FIG. 1 is a schematic perspective view of an amphibious vehicle according to a first embodiment.
Figure 2:
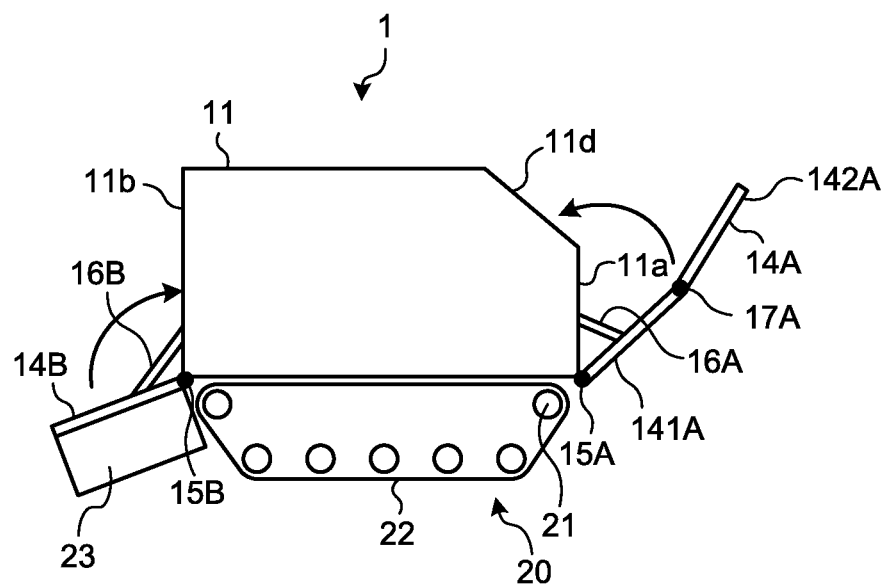
FIG. 2 is a side view of the amphibious vehicle according to the first embodiment.
Figure 3:
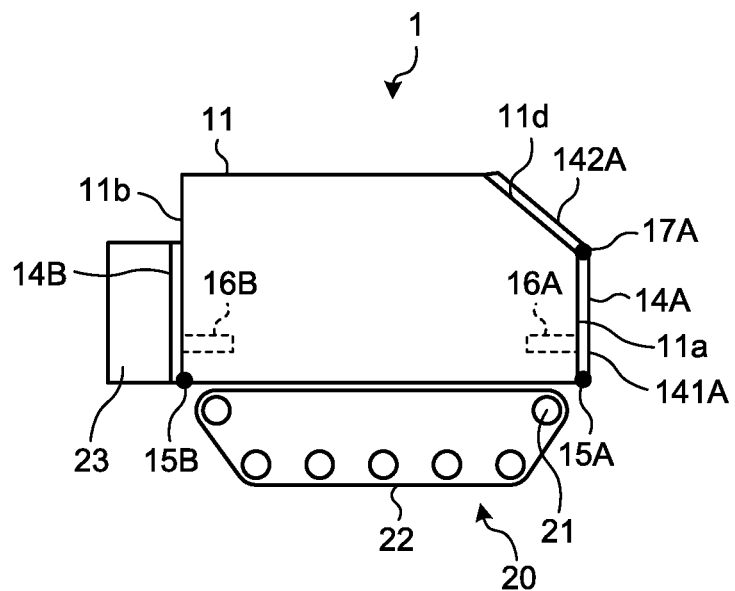
FIG. 3 is a side view of the amphibious vehicle according to the first embodiment.

FIG. 1 is a schematic perspective view of an amphibious vehicle 1 according to a first embodiment of the present invention. FIG. 2 and FIG. 3 are side views of the amphibious vehicle 1 according to the first embodiment of the present invention. As illustrated in FIG. 1 to FIG. 3, the amphibious vehicle 1 according to this embodiment includes: a vehicle main body 11, which is generally rectangular shaped; and a traveling apparatus 20, which is provided at a lower portion of this vehicle main body 11. In the vehicle main body 11, a propulsor (not illustrated) including a propeller or a water jet, which is used in a water traveling mode thereof, is provided. The traveling apparatus 20 includes: a sprocket 21, which is rotationally driven by a driving device (not illustrated) such as an engine; and a crawler track 22, which is rotationally driven by this sprocket. In this amphibious vehicle 1, a vehicle window 13 is provided at an upper portion of a front surface 11a in a traveling direction Fr of the vehicle main body 11, and a driver is able to sight outside from this vehicle window 13. With reference to FIG. 1, the example, in which the vehicle main body 11 is driven by the traveling apparatus 20 having the crawler track 22, has bee described, but a traveling apparatus having tires instead of the crawler track 22 may be used.

One end portion of a front portion flap (front portion plate shaped member) 14A is fixed to a lower end portion of the front surface 11a of the vehicle main body 11. This front portion flap 14A is attached to the lower end portion of the front surface 11a of the vehicle main body 11 via a hinge 15A, such that a principal surface 14a thereof (see FIG. 7) is inclined with respect to the front surface 11a of the vehicle main body 11. The front portion flap 14A has a width corresponding to a vehicle width of the vehicle main body 11. The front portion flap 14A includes: a lower portion flap (lower portion plate shaped member) 141A having one end portion thereof fixed to the lower end portion of the front surface 11a of the vehicle main body 11; and an upper portion flap (upper portion plate shaped member) 142A having one end portion thereof fixed to the other end portion of the lower portion flap 141A via a hinge 17A. The front portion flap 14A is attached, such that the principal surface 14a thereof forms a predetermined angle θ1 (see FIG. 7) with the front surface 11a of the vehicle main body 11 via a support member 16A. The support member 16A has one end fixed to a lower end portion of the vehicle main body 11 and is expandable and contractible.

The lower portion flap 141A has a principal surface with a width corresponding to the front surface 11a of the vehicle main body 11. The lower portion flap 141A is fixed to the lower end portion of the front surface 11a of the vehicle main body 11 to be turnable relatively to the front surface 11a of the vehicle main body 11 via the hinge 15A and the support member 16A. The upper portion flap 142A has a principal surface with a width corresponding to an inclined surface 11d of the vehicle main body 11. The upper portion flap 142A is fixed turnably relative to the lower portion flap 141A via the hinge 17A. The lower portion flap 141A is configured to be fixable to the front surface 11a of the vehicle main body 11 by a fixing member (not illustrated). The upper portion flap 142A is configured to be fixable to the inclined surface 11d of the front surface 11a of the vehicle main body 11 by a fixing member (not illustrated). The support member 16A is provided to be expandable and contractible in a front-rear direction of an advancing direction of the vehicle main body 11.

The principal surface of the lower portion flap 141A may be fixed turnably to the front surface 11a of the vehicle main body 11 by the hinge 15A driven by a driving unit (not illustrated). The principal surface of the lower portion flap 141A may be fixed turnably to the front surface 11a of the vehicle main body 11 by the support member 16A driven by a driving unit (not illustrated). Further, the principal surface of the upper portion flap 142A may be fixed turnably to the front surface 11a of the vehicle main body 11 by the hinge 17A driven by a driving unit (not illustrated).

Further, one end portion of a rear portion flap (rear portion plate shaped member) 14B is fixed to a lower end portion of a rear surface 11b of the vehicle main body 11. This rear portion flap 14B is attached to the lower end portion of the rear surface 11b of the vehicle main body 11 via a hinge 15B, such that a principal surface 14b thereof is inclined with respect to the rear surface 11b of the vehicle main body 11. The rear portion flap 14B has a width corresponding to the vehicle width of the vehicle main body 11. The rear portion flap 14B is attached, such that the principal surface 14b thereof forms a predetermined angle θ2 (see FIG. 7) with the rear surface 11b of the vehicle main body 11 via a support member 16B. The support member 16B has one end thereof fixed to a lower end portion of the vehicle main body 11 and is expandable and contractible. The lower portion flap 141A and the upper portion flap 142A may be modified as appropriate to any plate shaped members other than flat plates, such as corrugated plates, so long as effects of the present invention are achieved, similarly to the rear portion flap 14B.

Further, in the amphibious vehicle 1, the rear portion flap 14B at a rear surface 11b side of the vehicle main body 11 is fixed turnably relative to the rear surface 11b of the vehicle main body 11 via the hinge 15B. The rear portion flap 14B is configured to be fixable to the rear surface 11b of the vehicle main body 11 by a fixing member (not illustrated). The principal surface of the rear portion flap 14B may be fixed turnably to the rear surface 11b of the vehicle main body 11 by the hinge 15B driven by a driving unit (not illustrated). The principal surface of the rear portion flap 14B may be fixed turnably to the rear surface 11b of the vehicle main body 11 by the support member 16B driven by a driving unit (not illustrated).

In this amphibious vehicle 1, upon traveling on land, for example, the lower portion flap 141A of the front portion flap 14A is able to be fixed to the front surface 11a of the vehicle main body 11, and the upper portion flap 142A is able to be fixed to the inclined surface 11d. Further, in this amphibious vehicle 1, the rear portion flap 14B is able to be fixed to the rear surface 11b of the vehicle main body 11. The support member 16A is accommodatable in an accommodation space (not illustrated) provided at the front surface 11a of the vehicle main body 11, and the support member 16B is accommodatable in an accommodation space (not illustrated) provided at the rear surface 11b of the vehicle main body 11. As described above, since the front portion flap 14A provided at a front side of the vehicle main body 11 is configured to be foldable through the lower portion flap 141A and the upper portion flap 142A, which are mutually foldable, the front portion flap 14A is able to be fixed compactly to the front surface 11a of the vehicle main body 11 when the amphibious vehicle 1 lands from water to land. Similarly, the rear portion flap 14B provided at a rear side of the vehicle main body 11 is able to be fixed compactly to the rear surface 11b of the vehicle main body 11, too.

Figure 4:
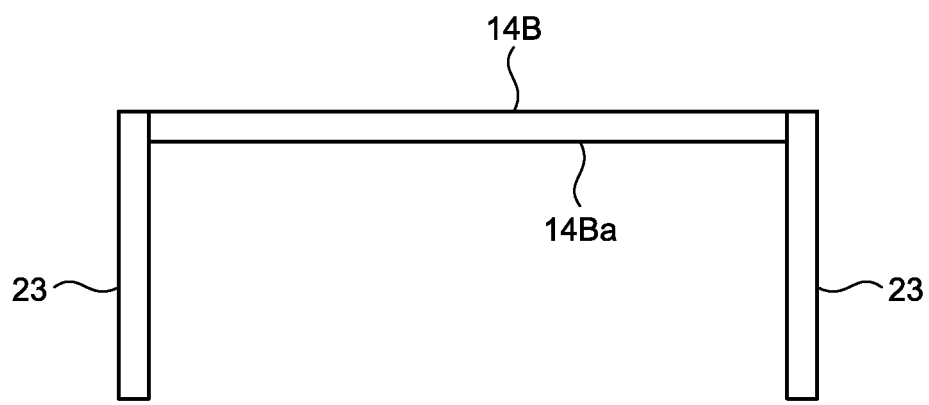
FIG. 4 is a schematic diagram of a rear portion flap and end plates, of the amphibious vehicle according to the first embodiment.

At both side end portions of the rear portion flap 14B, end plates (first rear portion end plates) 23 are respectively provided. FIG. 4 is a schematic diagram of the rear portion flap 14B and the end plates 23. As illustrated in FIG. 4, the end plates 23 are provided to stand downward from a lower surface 14Ba at both side ends of the rear portion flap 14B. In this embodiment, the example, in which the end plates are attached to both side ends of the rear portion flap 14B, has been described, but the end plates 23 are not necessarily attached to both side ends of the rear portion flap 14B, and may just be provided at both side end portions of the rear portion flap 14B. Further, although FIG. 4 illustrates the example, in which the end plates 23 are provided to stand vertically to the lower surface 14Ba of the rear portion flap 14B, the end plates 23 may be provided to stand at a certain angle with respect to the lower surface 14Ba of the rear portion flap 14B.

Figure 5A:
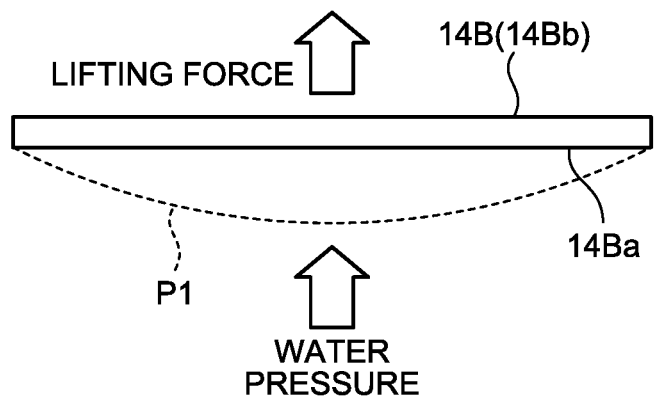
FIG. 5A is a diagram illustrating a relation between water pressure and lifting force acting on the rear portion flap.
Figure 5B:
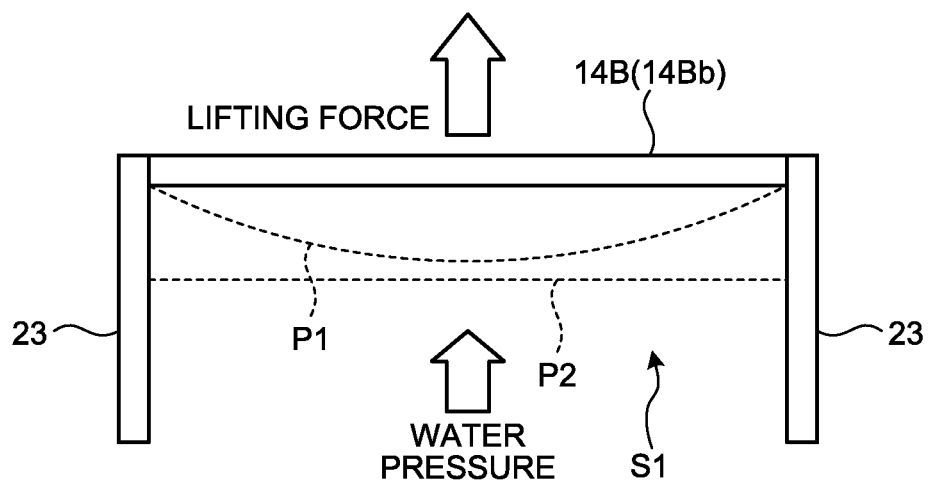
FIG. 5B is a diagram illustrating a relation between water pressure and lifting force acting on the rear portion flap provided with the end plates of the amphibious vehicle according to the first embodiment.

FIG. 5A is a diagram illustrating a relation between water pressure and lifting force acting on the rear portion flap 14B, and FIG. 5B is a diagram illustrating a relation between water pressure and lifting force acting on the rear portion flap 14B provided with the end plates 23. As illustrated in FIG. 5A, when the amphibious vehicle 1 travels on water, lifting force is generated at an upper surface 14Bb side of the rear portion flap 14B due to water pressure P1 from water flowing at a lower surface 14Ba side of the rear portion flap 14B. Since buoyant force is given to the vehicle main body 11 by this lifting force, stable traveling on water is enabled by providing the rear portion flap 14B. The water pressure P1 acting on the rear portion flap 14B is the largest at a central portion of the rear portion flap 14B, and decreases toward both end portions of the rear portion flap 14B.

As illustrated in FIG. 5B, when the end plates 23 are provided at the rear portion flap 14B, water flowing at the lower surface 14Ba side of the rear portion flap 14B passes through a space S1, the space S1 is a space surrounded by the lower surface 14Ba of the rear portion flap 14B and the end plates 23. Thereby, water pressure P2 is evenly added to the lower surface 14Ba side of the rear portion flap 14B, and thus the lifting force generated at the upper surface 14Bb side of the rear portion flap 14B is increased. Thereby, since buoyant force is further given to the vehicle main body 11, by providing the end plates 23 on the rear portion flap 14B, even more stable traveling on water is enabled. Further, since water flowing at the lower surface 14Ba side of the rear portion flap 14B is regulated by the end plates 23, swirls generated from both side end portions of the rear portion flap 14B are able to be reduced, and wave making resistance acting on the vehicle main body 11 is able to be reduced further.

Figure 6:
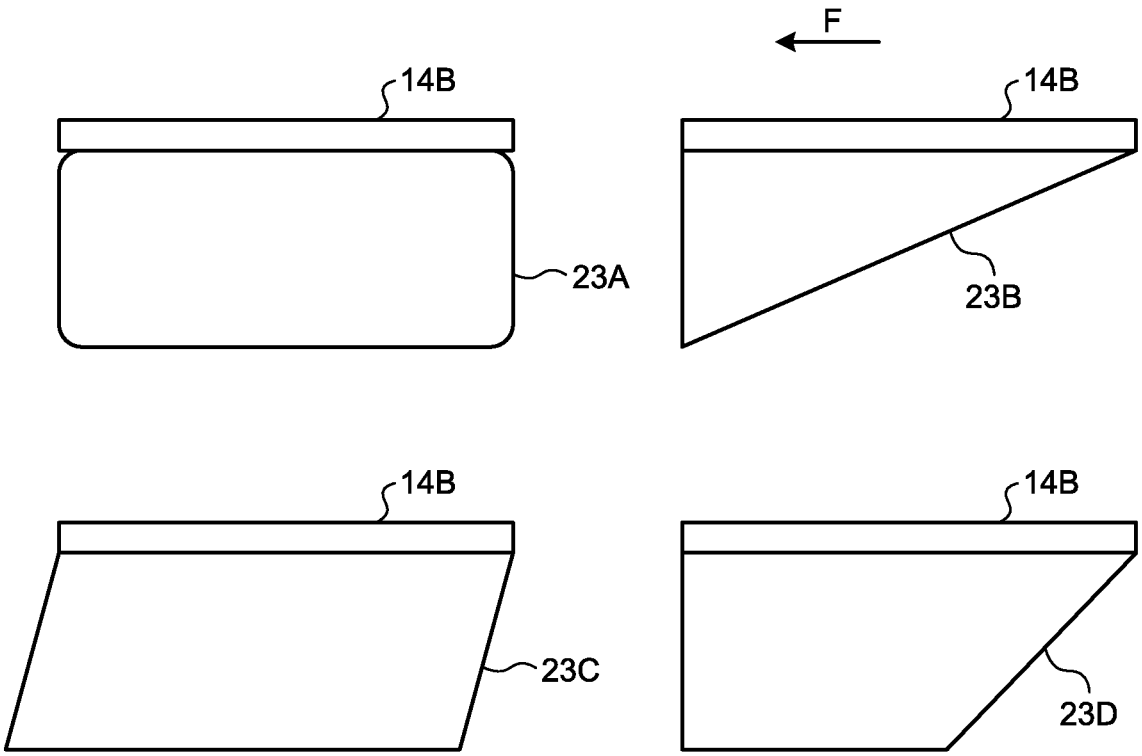
FIG. 6 is a diagram illustrating the rear portion flap and the end plates, according to the first embodiment.

FIG. 6 is a diagram illustrating the rear portion flap 14B and the end plates 23, according to this embodiment. The shape of the end plate 23 is not particularly limited, as long as it has a shape that enables water to flow into the space S1 surrounded by the rear portion flap 14B and the end plates 23, and the water pressure P2 acting on the rear portion flap 14B to increase. The shape of the end plate 23 may be, for example, in a side view thereof, an approximately rectangular shape (end plate 23A), a triangular shape (end plate 23B) having a hypotenuse forming a predetermined angle with respect to a direction of water flow F, an approximately parallelogrammatic shape (end plate 23C), or an approximately trapezoidal shape (end plate 23D). Of these, in terms of increasing the water pressure P2 acting on the rear portion flap 14B and reducing swirls and the like generated at both end portions of the rear portion flap 14B, the end plate 23B having the approximately triangular shape in a side view thereof is preferable.

Figure 7:
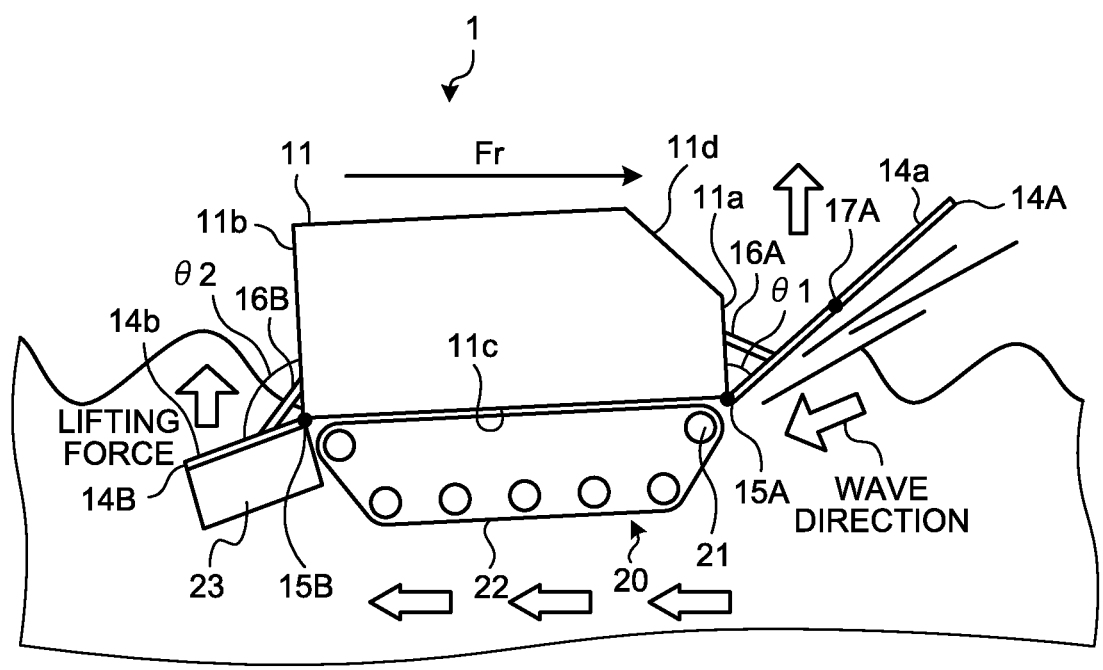
FIG. 7 is a side view of the amphibious vehicle upon traveling on water, according to the first embodiment.

Next, the overall operation of the amphibious vehicle 1 according to this embodiment will be described. FIG. 7 is a side view of the amphibious vehicle 1 upon traveling on water. As illustrated in FIG. 7, in the amphibious vehicle 1 according to this embodiment, the front portion flap 14A is attached to the lower end portion of the front surface 11a of the vehicle main body 11, such that the principal surface 14a of the front portion flap 14A is at the acute angle $\theta 1$ with respect to the front surface 11a of the vehicle main body 11. Thereby, when the amphibious vehicle 1 travels on water, waves on water pass through rearward via a lower surface 11c of the vehicle main body 11 from a lower surface of the front portion flap 14A. Accordingly, lifting force acts upward from a lower portion at a front surface 11a side of the vehicle main body 11, and wave making resistance from the front surface 11a of the vehicle main body 11 is able to be reduced. As a result, even if the amphibious vehicle 1 is caused to travel at high speed (for example, at 14 km/h or more) on water, since the vehicle main body 11 is configured to glide, posture of the vehicle main body 11 is stabilized and submergence of a front portion of the vehicle main body 11 is able to be prevented. In terms of improving the above described functions and effects even more, the front portion flap 14A is preferably provided at a lower end of the front surface 11a of the vehicle main body 11.

Further, in the amphibious vehicle 1 according to this embodiment, the rear portion flap 14B is attached to the lower end portion of the rear surface 11b of the vehicle main body 11, such that the principal surface 14b of the rear portion flap 14B is at the obtuse angle $\theta 2$ with respect to the rear surface 11b of the vehicle main body 11. Thereby, when the amphibious vehicle 1 travels on water, waves on water go through to the rear of the vehicle main body 11 via a lower surface of the rear portion flap 14B from the lower surface 11c of the vehicle main body 11. When this happens, since the end plates 23 are provided at a lower surface side of the rear portion flap 14B in this embodiment, water flows in the space S1 surrounded by the lower surface of the rear portion flap 14B and the end plates 23. Thereby, large lifting force acts upward from a lower portion at the rear surface 11b side of the vehicle main body 11, and generation of swirls and the like at both side end portions of the rear portion flap 14B is able to be prevented. As a result, even if the amphibious vehicle 1 is caused to travel at high speed (for example, at 14 km/h or more) on water, since the vehicle main body 11 is configured to glide, wave making resistance from the front surface 11a side of the vehicle main body 11 is able to be reduced, posture of the vehicle main body 11 is able to be stabilized, and submergence of a rear portion of the vehicle main body 11 is able to be prevented. In terms of improving the above described functions and effects even more, the rear portion flap 14B is preferably provided at a lower end of the rear surface 11b of the vehicle main body 11.

As described above, since the amphibious vehicle 1 according to the above described embodiment enables to prevent water from entering the space between the end plates 23 and the rear portion of the vehicle main body 11 by the end plates 23 provided at the rear portion flap 14B, generation of swirls at the rear side of the vehicle main body 11 when the vehicle main body 11 travels on water is able to be prevented. Thereby, since the amphibious vehicle 1 enables wave making resistance upon traveling on water to be reduced, resistance acting on the vehicle main body 11 is able to be reduced, and propulsive performance is able to be improved.

In the above described embodiment, the example, in which plate shaped members having flat plate shapes are used as the front portion flap 14A and the rear portion flap 14B, has been described. However, the shapes of the front portion flap 14A and the rear portion flap 14B may be modified, as appropriate, to any plate shaped members other than flat plates, such as corrugated plates, so long as the effects of the present invention are achieved. Similarly, the lower portion flap 141A and the upper portion flap 142A may be modified, as appropriate, to any plate shaped members other than flat plates, such as corrugated plates, so long as the effects of the present invention are achieved. Further, widths of the front portion flap 14A and the rear portion flap 14B may be modified, as appropriate, so long as the effects of the present invention are achieved. Furthermore, in this embodiment, the example, in which the front portion flap 14A and the rear portion flap 14B are attached to the vehicle main body 11 by the hinges 15A and 15B, has been described. However, the front portion flap 14A and the rear portion flap 14B are not necessarily fixed by use of the hinges 15A and 15B, as long as the principal surfaces 14a and 14b are able to be fixed at the predetermined angles θ1 and θ2 from the front surface 11a or the rear surface 11b of the vehicle main body 11. Moreover, in this embodiment, the example, in which the front portion flap 14A and the rear portion flap 14B are fixed to the vehicle main body 11 by the support members 16A and 16B, has been described. However, the front portion flap 14A and the rear portion flap 14B are not necessarily fixed to the vehicle main body 11 via the support members 16A and 16B. In addition, in the above described embodiment, although the example, in which the front portion flap 14A is formed of two plate shaped members that are the lower portion flap 141A and the upper portion flap 142A, has been described, the front portion flap 14A may be formed of a single plate shaped member.

Second Embodiment

Next, a second embodiment of the present invention will be described. Hereinafter, redundant description will be avoided by description with a focus on differences from the above described first embodiment.

Figure 8:
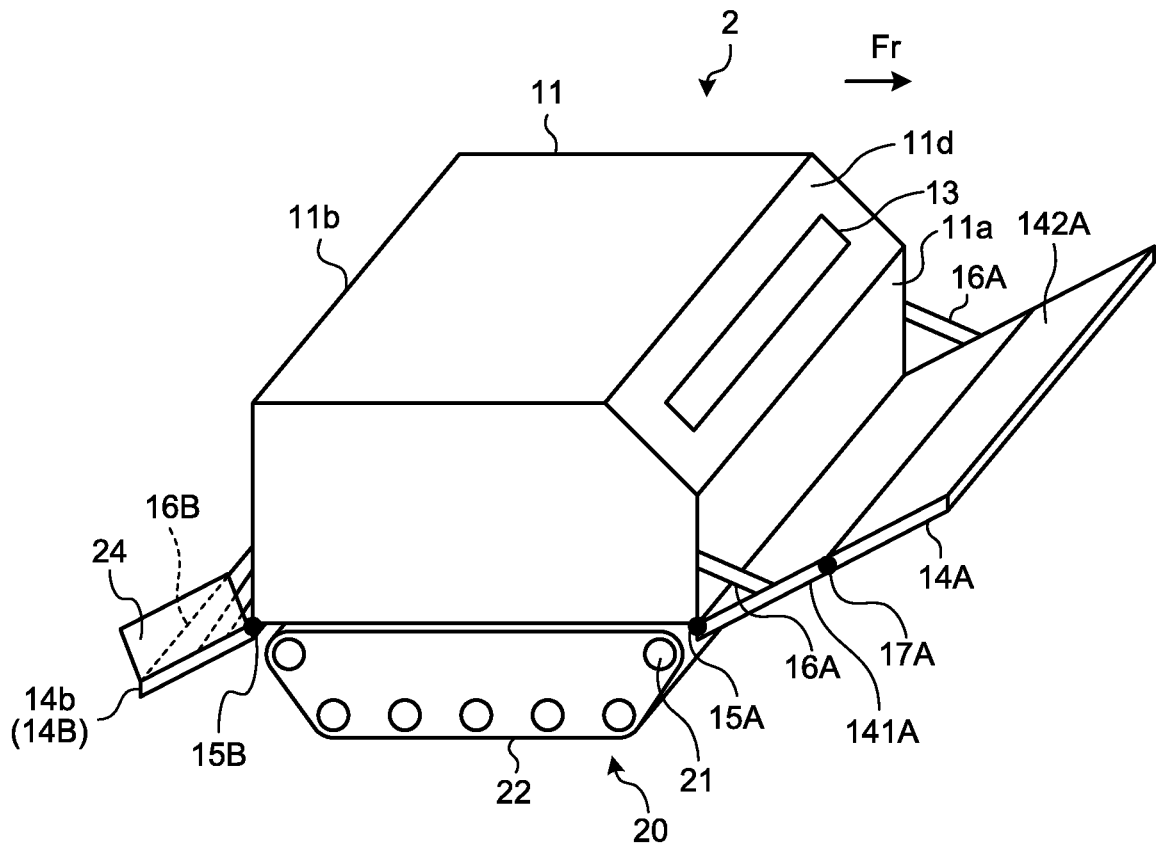
FIG. 8 is a schematic perspective view of an amphibious vehicle according to a second embodiment.
Figure 9:
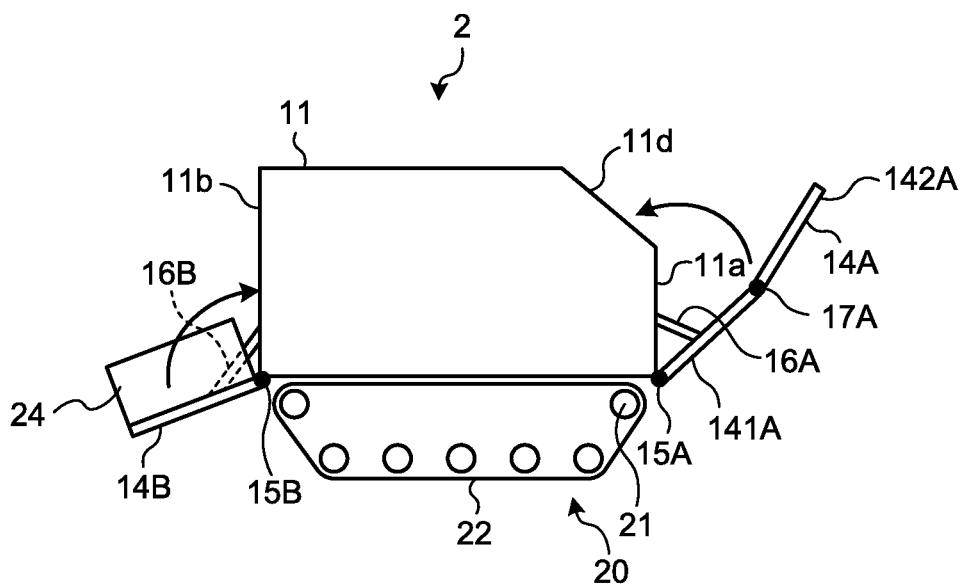
FIG. 9 is a side view of the amphibious vehicle according to the second embodiment.
Figure 10:
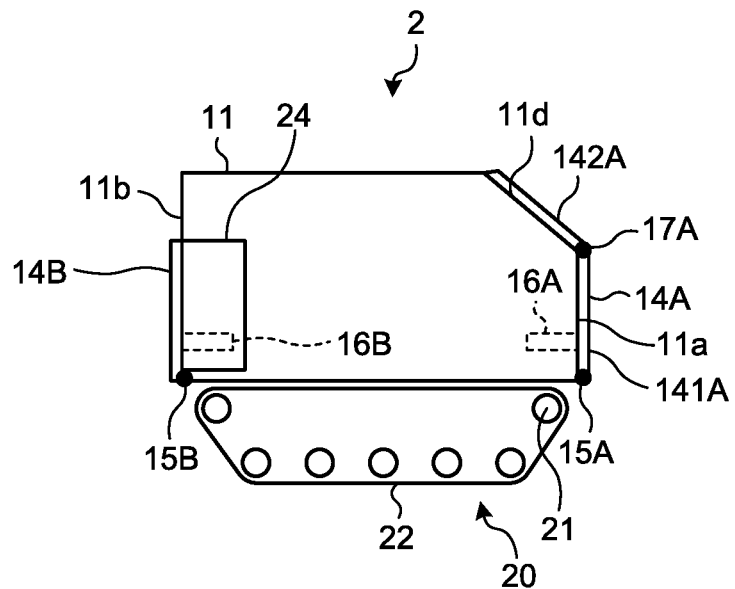
FIG. 10 is a side view of the amphibious vehicle according to the second embodiment.

FIG. 8 is a schematic perspective view of an amphibious vehicle 2 according to the second embodiment of the present invention. FIG. 9 and FIG. 10 are side views of the amphibious vehicle 2 according to the second embodiment of the present invention. As illustrated in FIG. 8 to FIG. 10, the amphibious vehicle 2 according to this embodiment includes, instead of the end plates 23 of the amphibious vehicle 1 according to the above described first embodiment, end plates (second rear portion end plates) 24 provided at both side end portions of the rear portion flap 14B. The remaining configuration is the same as that of the amphibious vehicle 1 according to the above described first embodiment, and thus description thereof will be omitted.

Figure 11:
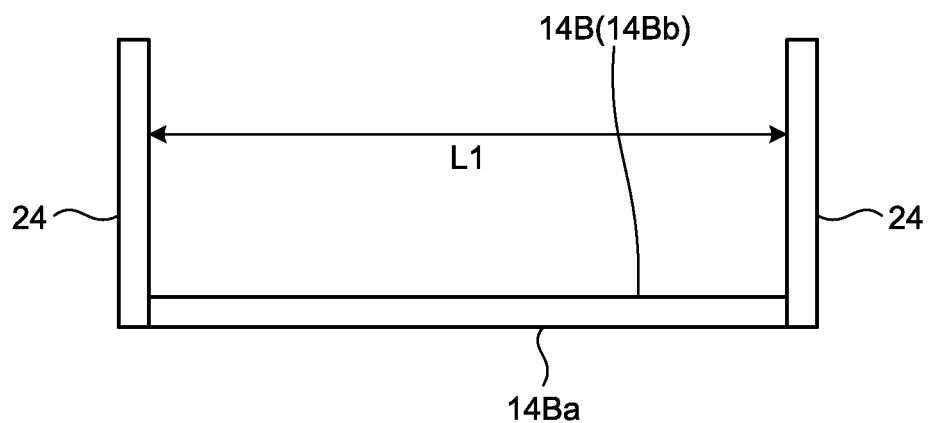
FIG. 11 is a schematic diagram of a rear portion flap and end plates of the amphibious vehicle according to the second embodiment.

FIG. 11 is a schematic diagram of the rear portion flap 14B and the end plates 24. As illustrated in FIG. 11, the end plates 24 are provided to stand upward from an upper surface 14Bb at both side ends of the rear portion flap 14B. A distance L1 between the end plates 24 is preferably made slightly larger than the vehicle width of the vehicle main body 11. Thereby, as illustrated in FIG. 10, when the rear portion flap 14B is accommodated, the end plates 24 are able to be placed on both sides of the vehicle main body 11, and thus compact accommodation is enabled. In this embodiment, the example, in which the end plates 24 are attached to both side ends of the rear portion flap 14B, has been described. However, the end plates 24 are not necessarily attached to both side ends of the rear portion flap 14B, and may just be provided at both side end portions of the rear portion flap 14B. Further, FIG. 11 illustrates the example, in which the end plates 24 are provided to stand vertically to the upper surface 14Bb of the rear portion flap 14B, but the end plates 24 may be provided to stand at a certain angle with respect to the upper surface 14Bb of the rear portion flap 14B.

Figure 12A:
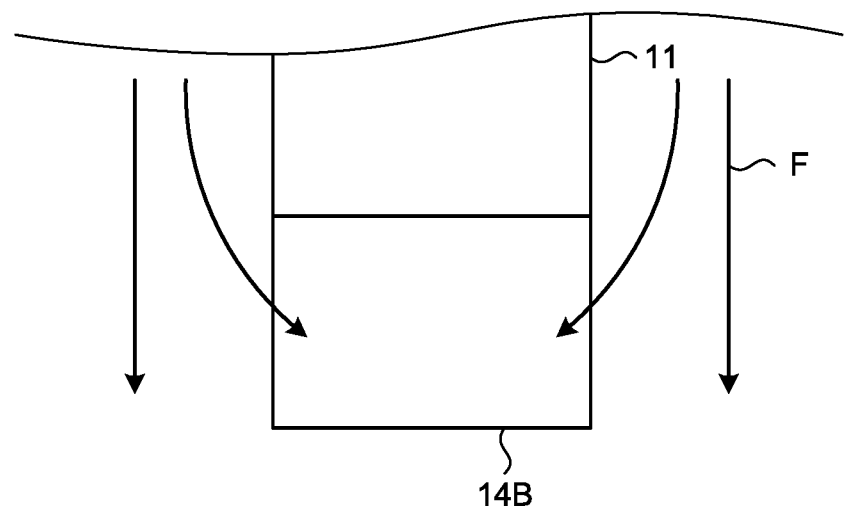
FIG. 12A is a diagram illustrating water flow relative to the rear portion flap.
Figure 12B:
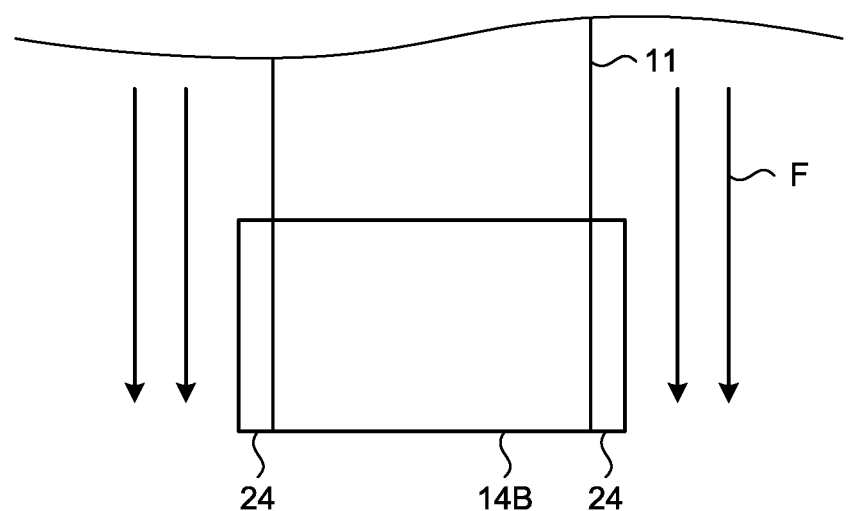
FIG. 12B is a diagram illustrating water flow relative to the rear portion flap provided with the end plates of the amphibious vehicle according to the second embodiment.

FIG. 12A is a diagram illustrating water flow relative to the rear portion flap 14B, and FIG. 12B is a diagram illustrating water flow relative to the rear portion flap 14B provided with the end plates 24. As illustrated in FIG. 12A, when the amphibious vehicle 2 travels on water, a part of water flow F flowing toward the rear portion flap 14B from both sides of the vehicle main body 11 flows to the rear side of the vehicle main body 11 from both sides of the rear portion flap 14B, and thus swirls and the like are generated and wave making resistance is increased.

As illustrated in FIG. 12B, when the ends plates are provided at the rear portion flap 14B, water flow F flowing toward the rear portion flap 14B from both sides of the vehicle main body 11 is regulated by the end plates 24, and will not flow to the rear side of the vehicle main body 11 from both sides of the rear portion flap 14B. Thereby, generation of swirls and the like at both side end portions of the rear portion flap 14B is able to be reduced, and thus wave making resistance is able to be reduced.

The shape of the end plate 24 is not particularly limited, as long as it is a shape that enables water flow of water flowing near the rear portion flap 14B to be regulated. As the shape of the end plate 24, for example, the same shape as that of the end plate 23 illustrated in FIG. 6 may be used. Of these, in terms of efficiently regulating water flowing along the rear portion flap 14B, the same shape as that of the end plate 23B having the approximately triangular shape in a side view thereof is preferable.

Figure 13:
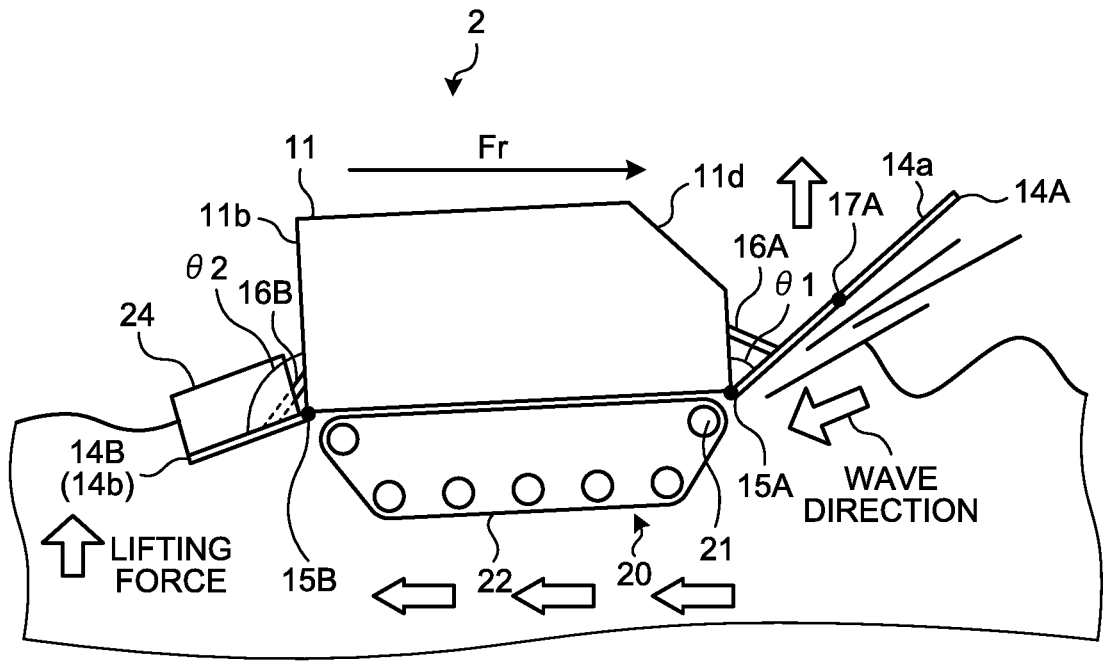
FIG. 13 is a side view of the amphibious vehicle upon traveling on water, according to the second embodiment.

Next, the overall operation of the amphibious vehicle according to this embodiment will be described. FIG. 13 is a side view of the amphibious vehicle 2 upon traveling on water. As illustrated in FIG. 13, in the amphibious vehicle 2 according to this embodiment, since the end plates 24 are provided at an upper surface side of the rear portion flap 14B, upon traveling on water, water flowing at both sides of the vehicle main body 11 flows at both sides of the end plates 24 of the rear portion flap 14B and at the lower surface side of the rear portion flap 14B. Thereby, lifting force acts upward from a lower portion at the rear surface 11b side of the vehicle main body 11, and generation of swirls and the like at both side end portions of the rear portion flap 14B is able to be prevented. As a result, even if the amphibious vehicle 2 is caused to travel at high speed (for example, at 14 km/h or more) on water, wave making resistance from the front surface 11a side of the vehicle main body 11 is able to be reduced, posture of the vehicle main body 11 is able to be stabilized, and submergence of the rear portion of the vehicle main body 11 is able to be prevented.

Third Embodiment

Next, a third embodiment of the present invention will be described. Hereinafter, redundant description will be avoided by description with a focus on differences from the above described first embodiment.

Figure 14:
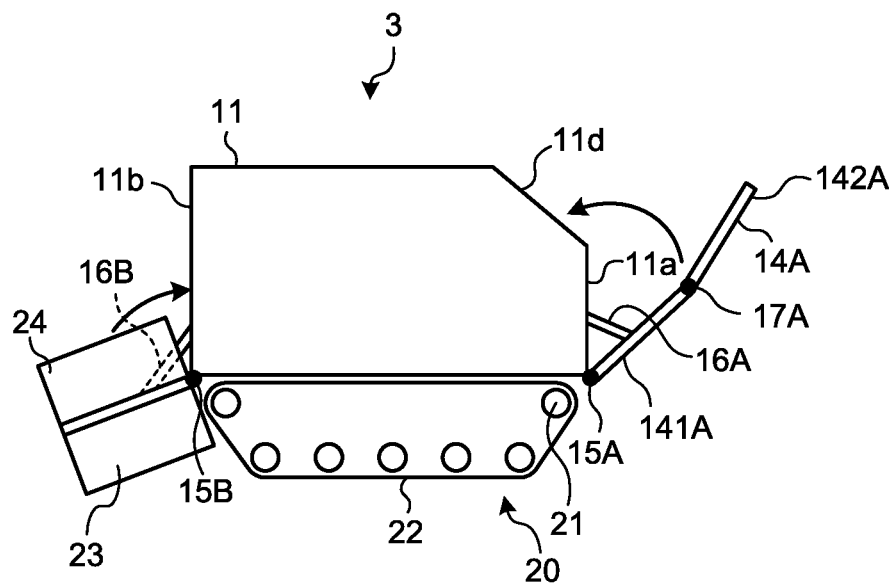
FIG. 14 is a side view of an amphibious vehicle according to a third embodiment.

FIG. 14 is a side view of an amphibious vehicle 3 according to a third embodiment of the present invention. As illustrated in FIG. 14, this amphibious vehicle 3 includes, in addition to the configuration of the amphibious vehicle 1 according to the above described first embodiment, the end plates 24 of the rear portion flap 14B according to the above described second embodiment. The remaining configuration is the same as that of the amphibious vehicle 1 according to the above described first embodiment, and thus description thereof will be omitted.

Figure 15:
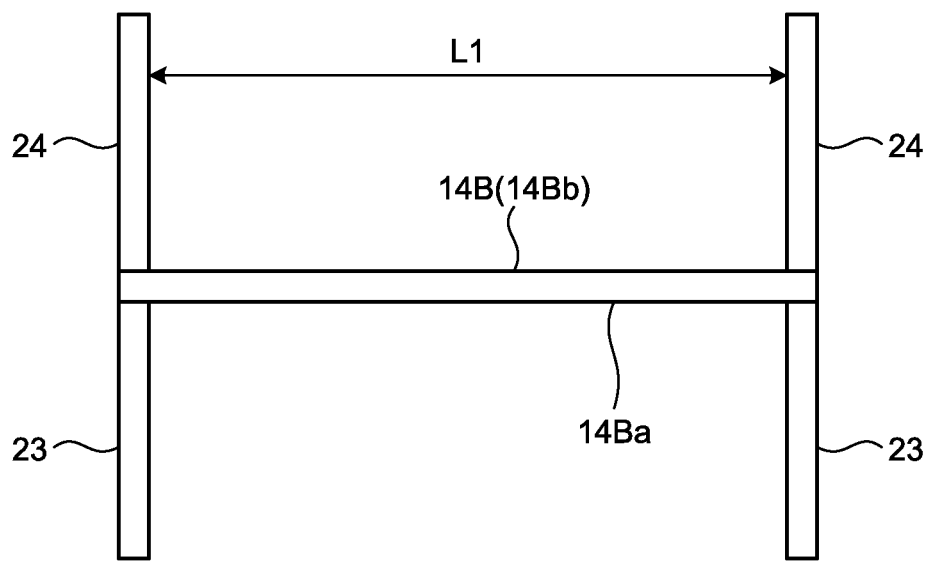
FIG. 15 is a schematic diagram of a rear portion flap and end plates, of the amphibious vehicle according to the third embodiment.

FIG. 15 is a schematic diagram of the rear portion flap 14B and the end plates 23 and 24. As illustrated in FIG. 15, the end plates (first rear portion end plates) 23 are provided to stand downward from the lower surface 14Ba at both side ends of the rear portion flap 14B. The end plates (second rear portion end plates) 24 are provided to stand upward from the upper surface 14Bb at both side ends of the rear portion flap 14B. Since the configurations of the end plates 23 and 24 are the same as those of the above described first embodiment and second embodiment, description thereof will be omitted.

The amphibious vehicle 3 according to this embodiment enables lifting force and flow regulating effects to be obtained by the end plates 23 and 24 provided at the rear portion flap 14B. As a result, even if the amphibious vehicle 3 is caused to travel at high speed (for example, at 14 km/h or more) on water, wave making resistance from the front surface 11a side of the vehicle main body 11 is able to be reduced, posture of the vehicle main body 11 is able to be stabilized, and submergence of the rear portion of the vehicle main body 11 is able to be prevented.

Fourth Embodiment

Next, a fourth embodiment of the present invention will be described. Hereinafter, redundant description will be avoided by description with a focus on differences from the above described first embodiment.

Figure 16:
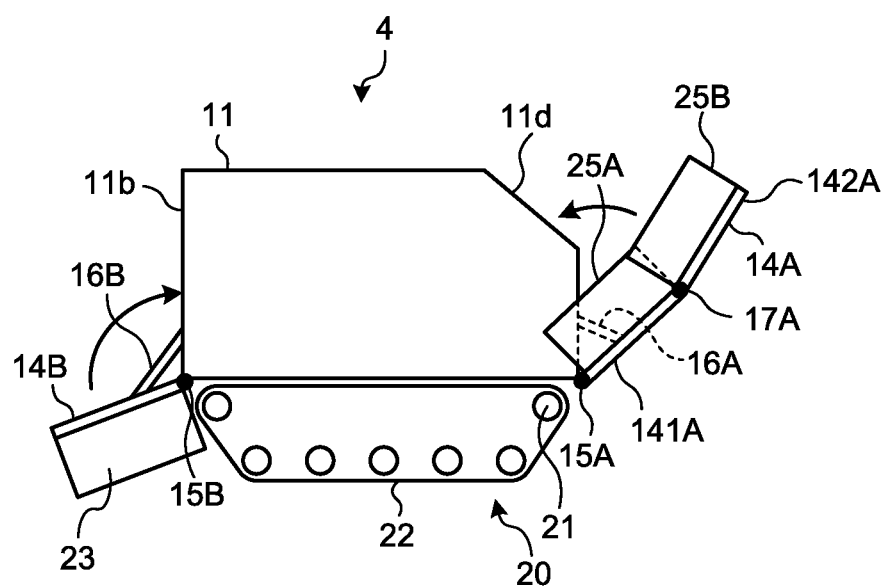
FIG. 16 is a side view of an amphibious vehicle according to a fourth embodiment.

FIG. 16 is a side view of an amphibious vehicle 4 according to a fourth embodiment of the present invention. The amphibious vehicle 4 according to this embodiment includes, in addition to the configuration of the amphibious vehicle 1 according to the above described first embodiment: end plates (first front portion end plates) 25A provided at the lower portion flap 141A of the front portion flap 14A; and end plates (second front portion end plates) 25B provided at the upper portion flap 142A. The remaining configuration is the same as that of the amphibious vehicle 1 according to the first embodiment, and thus description thereof will be omitted.

Figure 17:
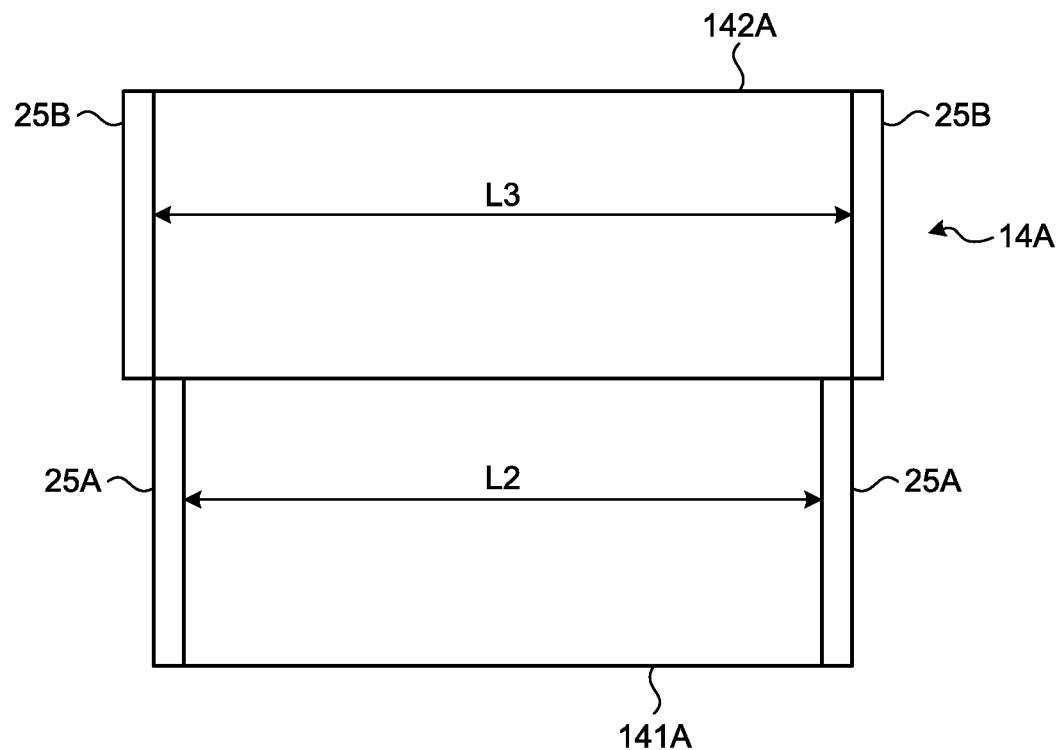
FIG. 17 is a schematic plan view of a front portion flap of the amphibious vehicle according to the fourth embodiment.
Figure 18:
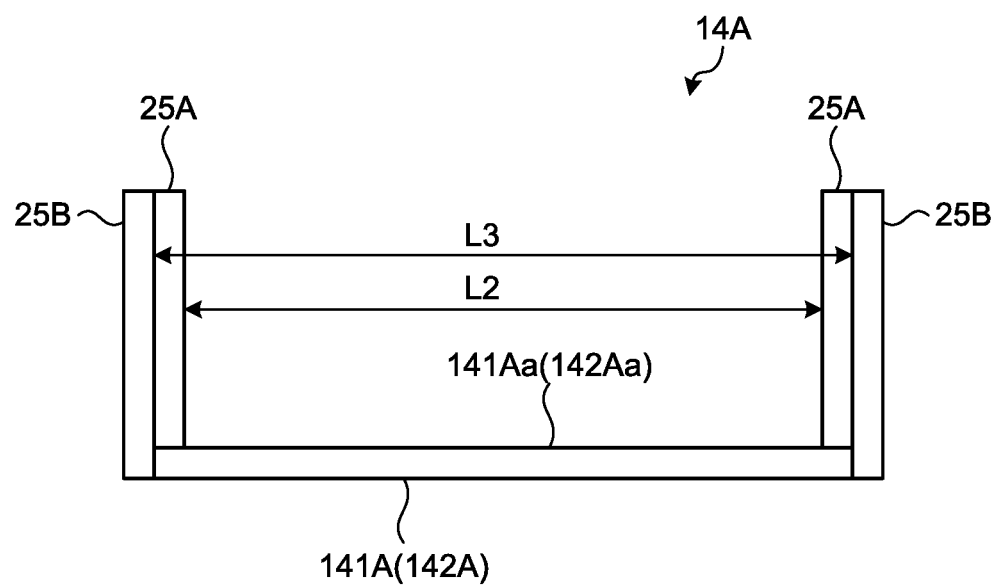
FIG. 18 is a side view of the front portion flap of the amphibious vehicle according to the fourth embodiment.

FIG. 17 is a schematic plan view of the front portion flap 14A, and FIG. 18 is a side view of the front portion flap 14A. As illustrated in FIG. 17 and FIG. 18, the end plates 25A are provided at both side end portions of the lower portion flap 141A. The end plates 25B are provided at both side end portions of the upper portion flap 142A. The end plates 25A are provided to stand upward from an upper surface 141Aa of the lower portion flap 141A. The end plates 25B are provided to stand upward from an upper surface 142Aa of the lower portion flap 142A. Further, in this embodiment, a distance L2 between the end plates 25A of the lower portion flap 141A is less than a distance L3 between the end plates 25B of the upper portion flap 142A, by a distance that is slightly larger than thicknesses of the end plates 25A. Thereby, as illustrated in FIG. 18, the end plates 25B of the upper portion flap 142A are able to overlap outer sides of the end plates 25A of the lower portion flap 141A, and thus an angle between the lower portion flap 141A and the upper portion flap 142A is able to be changed. In this embodiment, the example, in which the end plates 25A and the end plates 25B are attached to both side ends of the lower portion flap 141A and the upper portion flap 142A, has been described. However, the end plates 25A and the end plates 25B are not necessarily attached to both side ends of the lower portion flap 141A and the upper portion flap 142A, and may just be provided at both side end portions of the lower portion flap 141A and the upper portion flap 142A. Further, FIG. 18 illustrates the example, in which the end plates 25A and the end plates 25B are provided to stand vertically to lower surfaces of the lower portion flap 141A and the upper portion flap 142A, but the end plates 25A and the end plates 25B may be provided to stand at certain angles from the lower surfaces of the lower portion flap 141A and the upper portion flap 142A.

Figure 19A:
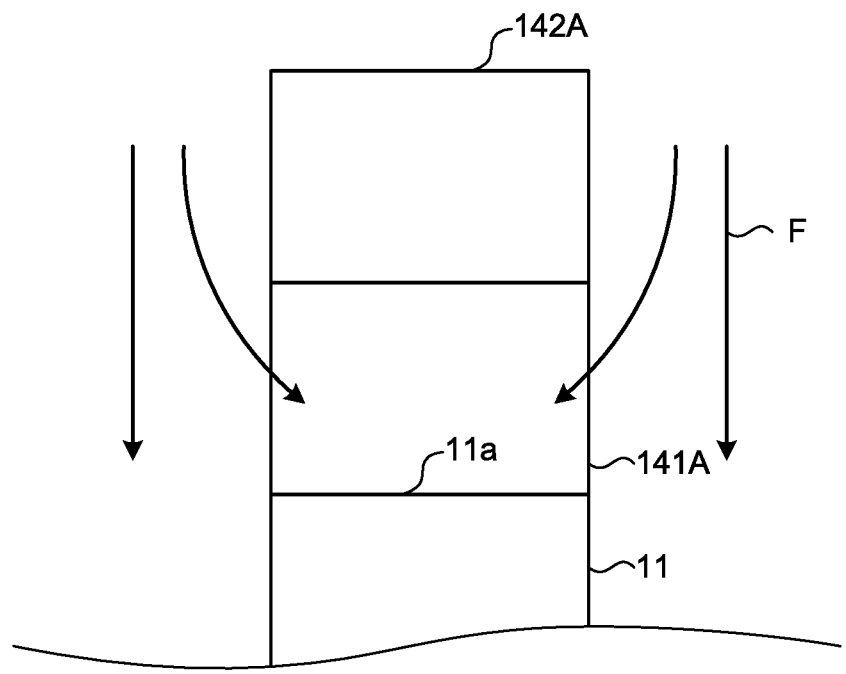
FIG. 19A is a diagram illustrating water flow relative to the front portion flap.
Figure 19B:
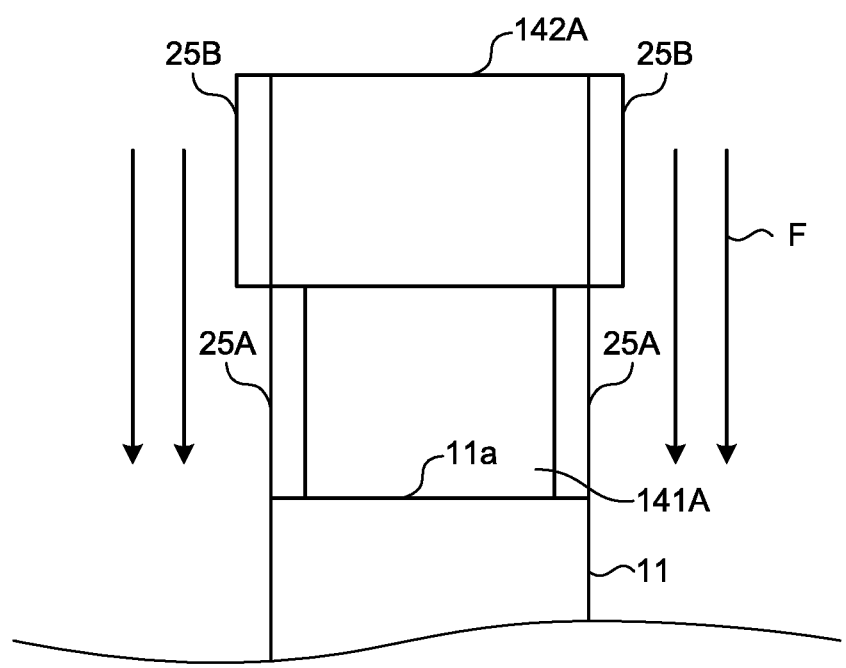
FIG. 19B is a diagram illustrating water flow relative to the front portion flap provided with first front portion end plates and second front portion end plates of the amphibious vehicle according to the fourth embodiment.

FIG. 19A is a diagram illustrating water flow relative to the front portion flap 14A, and FIG. 19B is a diagram illustrating water flow relative to the front portion flap 14A provided with the end plates 25A and the end plates 25B. As illustrated in FIG. 19A, when the amphibious vehicle 4 travels on water, water from the front side of the vehicle main body 11 flows toward the front surface 11a of the vehicle main body 11 via both sides of the front portion flap 14A. As a result, water flow F is generated toward the front surface 11a of the vehicle main body 11 from both sides of the front portion flap 14A, and wave making resistance due to the traveling of an amphibious vehicle 5 is increased.

As illustrated in FIG. 19B, when the end plates 25A and the end plates 25B are provided at the front portion flap 14A, water from the front side of the vehicle main body 11 flows along both sides of the front portion flap 14A and flows to both sides of the vehicle main body 11. As a result, the water flow F from the front side of the vehicle main body 11 is regulated by the end plates 25A and 25B, and will not flow to the front surface 11a of the vehicle main body 11. Thereby, generation of swirls and the like at both side end portions of the front portion flap 14A is able to be reduced, and thus wave making resistance is able to be reduced.

FIG. 20 is a diagram illustrating the front portion flap 14A, and the end plates 24A and 25B, according to this embodiment. The arrangement and shapes of the end plates 25A and 25B are not particularly limited, as long as generation of water flow to the front surface 11a of the vehicle main body 11 from both sides of the front portion flap 14A is able to be prevented. As illustrated in FIG. 20, as to the arrangement of the end plates 25A and 25B, the end plates 25A may be provided at the lower portion flap 141A, and the end plates 25B may be not provided at the upper portion flap 142A. Further, as to the shapes of the end plates 25A and 25B, a size of the end plate 25B may be smaller than that of the end plate 25A. In this case, the end plate 25B may be shaped such that the end plate 25B is provided over a range, for example, from a connected portion between the lower portion flap 141A and the upper portion flap 142A, to about a half of the upper portion flap 142A. Furthermore, the end plate 25B may be shaped such that a height thereof from the upper surface 142Aa of the upper portion flap 142A is varied within the end plate 25B. In this case, the end plate 25B may be shaped, such that a height h2 thereof is about half a height h1 thereof of a portion closer to the connected portion between the lower portion flap 141A and the upper portion flap 142A, the height h2 being a height of a portion at an opposite side of the connected portion.

Fifth Embodiment

Next, a fifth embodiment of the present invention will be described. Hereinafter, redundant description will be avoided by description with a focus on differences from the above described first embodiment.

Figure 21:
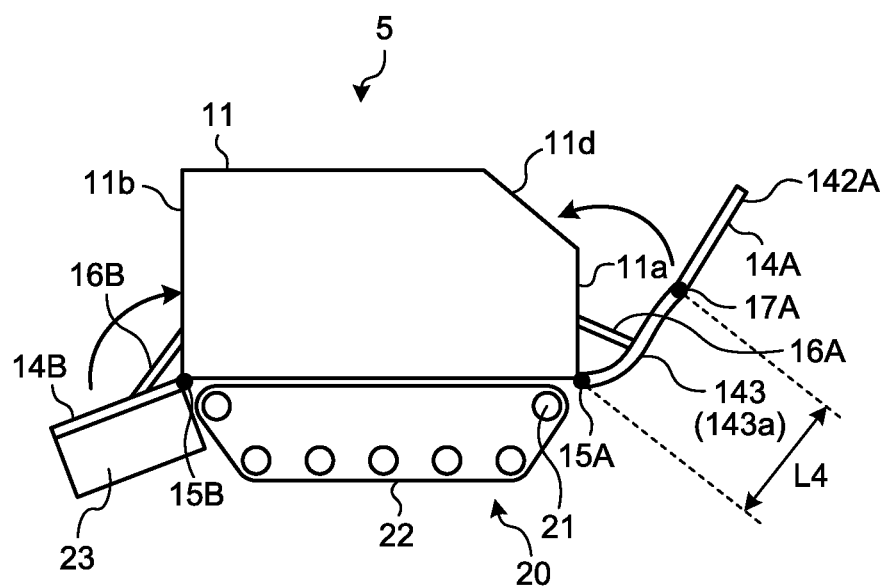
FIG. 21 is a side view of an amphibious vehicle according to a fifth embodiment.

FIG. 21 is a side view of an amphibious vehicle 5 according to a fifth embodiment of the present invention. The amphibious vehicle 5 according to this embodiment includes, instead of the lower portion flap 141A of the front portion flap 14A of the amphibious vehicle 1 according to the above described first embodiment, a lower portion flap 143 having a rear end portion that is curved, the rear end portion being a portion connected to the vehicle main body 11. This lower portion flap 143 has a curved portion 143a having a radius of curvature of, for example, about 2/5R to 4/5R with respect to a distance L4 to a connected portion between the lower portion flap 143 and the upper portion flap 141A. By such use of the lower portion flap 143 having the curved portion 143a, the portion connecting the lower portion flap 143 and the vehicle main body 11 together is able to be made smooth. The remaining configuration is the same as that of the amphibious vehicle 1 according to the above described first embodiment, and thus description thereof will be omitted.

Figure 22A:
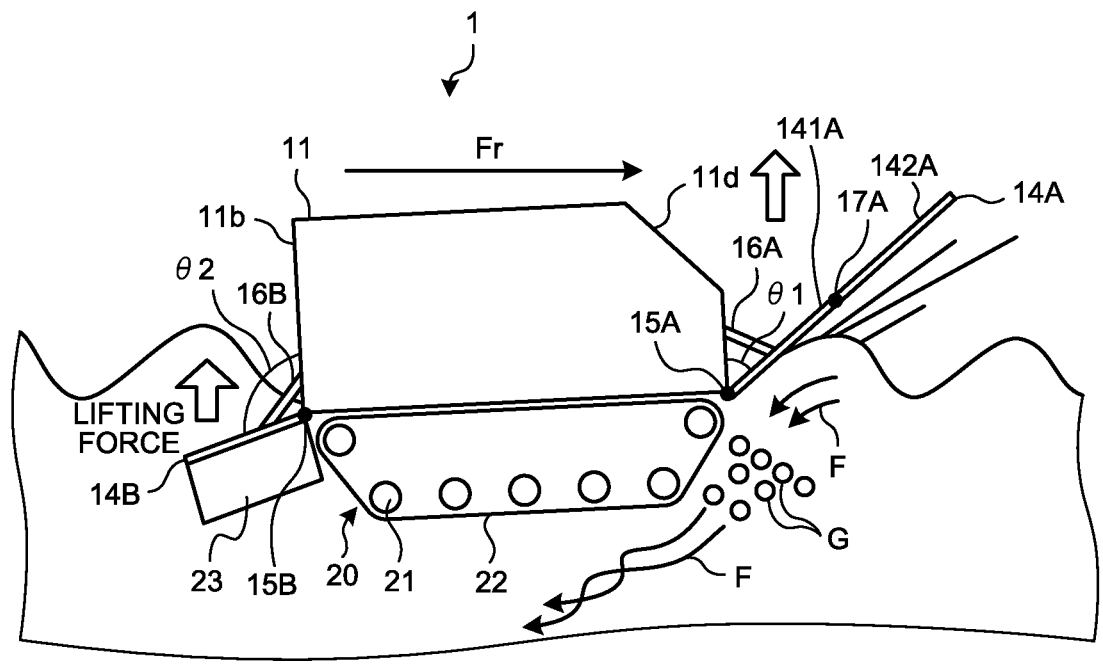
FIG. 22A is a diagram illustrating water flow when the amphibious vehicle according to the first embodiment travels on water.
Figure 22B:
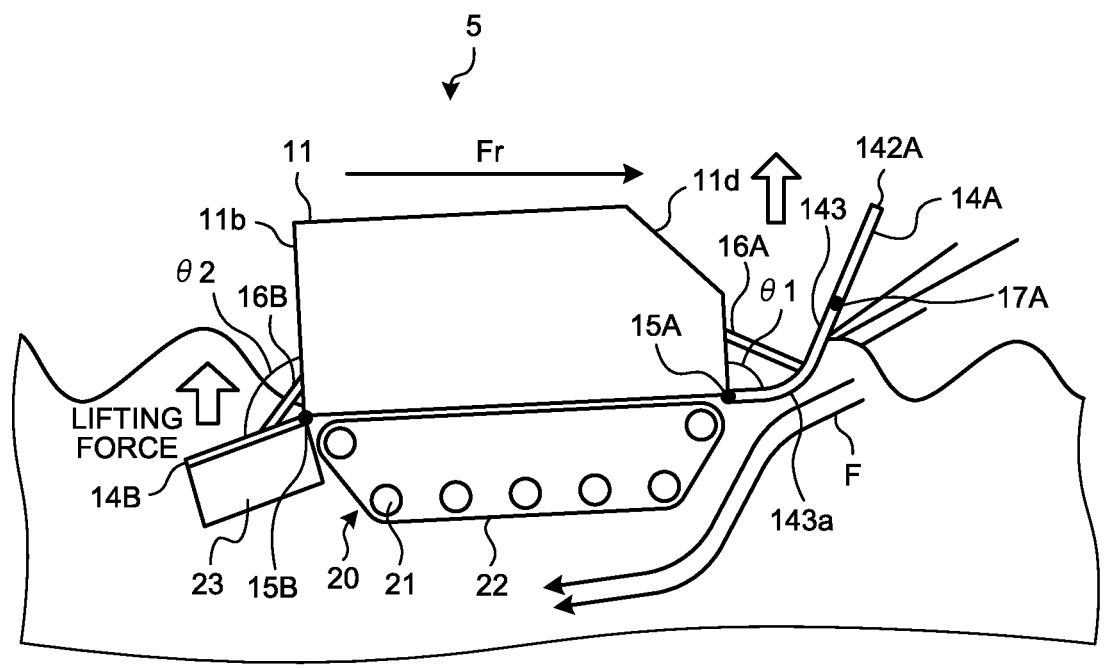
FIG. 22B is a diagram illustrating water flow when the amphibious vehicle according to the fifth embodiment travels on water.

FIG. 22A is a diagram illustrating water flow when the amphibious vehicle 1 according to the first embodiment travels on water, and FIG. 22B is a diagram illustrating water flow when the amphibious vehicle 5 according to the fifth embodiment travels on water. As illustrated in FIG. 22A, when the amphibious vehicle 1 travels on water, water from the front side of the vehicle main body 11 flows to a lower side of the vehicle main body 11 via a lower surface side of the front portion flap 14A. Since respective parts of the portion connecting between the lower portion flap 141A and the vehicle main body 11 are sharp, water flowing from a lower side of the lower portion flap 141A to a lower surface side of the vehicle main body 11 contains air G. Further, water flow F flowing at the lower surface side of the vehicle main body 11 becomes disordered water flow or separated water flow, and flow acting on the rear portion flap 14B and the vehicle main body 11 is influenced thereby.

As illustrated in FIG. 22B, when the amphibious vehicle 5 including the lower portion flap 143 travels on water, water from the front side of the vehicle main body 11 flows to the lower side of the vehicle main body 11 via a lower surface of the lower portion flap 143. Since the portion connecting between the lower portion flap 143 and the vehicle main body 11 is smooth due to the curved portion 143a, water flowing to the lower surface side of the vehicle main body 11 from a lower side of the lower portion flap 143 will not contain air G. Further, the water flow F flowing at the lower surface side of the vehicle main body 11 is regulated and disordered flow will not be generated. Thereby, since water flow acting on the vehicle main body 11 and the rear portion flap 14B is able to be regulated, wave making resistance against the vehicle main body 11 is able to be reduced even more.

REFERENCE SIGNS LIST 1, 2, 3, 4, 5 AMPHIBIOUS VEHICLE
11 VEHICLE MAIN BODY
11a FRONT SURFACE
11b REAR SURFACE
11c LOWER SURFACE
11d INCLINED SURFACE
13 VEHICLE WINDOW
14A FRONT PORTION FLAP (FRONT PORTION PLATE SHAPED MEMBER)
141A, 143 LOWER PORTION FLAP (LOWER PORTION PLATE SHAPED MEMBER)
142A UPPER PORTION FLAP (UPPER PORTION PLATE SHAPED MEMBER)
143a CURVED PORTION
14B REAR PORTION FLAP (REAR PORTION PLATE SHAPED MEMBER)
15A, 15B HINGE
16A, 16B SUPPORT MEMBER
17A HINGE
20 TRAVELING APPARATUS
21 SPROCKET
22 CRAWLER TRACK
23 END PLATE (FIRST REAR PORTION END PLATE)
24 END PLATE (SECOND REAR PORTION END PLATE)
25A END PLATE (FIRST FRONT PORTION END PLATE)
25B END PLATE (SECOND FRONT PORTION END PLATE)

The invention claimed is:
1. An amphibious vehicle, comprising:
a vehicle main body, having a generally rectangular shape that is movable on water and on land;
a rear portion plate shaped member having a front end portion that is fixed to a rear portion of the vehicle main body and having a width corresponding to the width of the vehicle main body;
rear portion end plates respectively provided at each side of the rear portion plate shaped member, wherein
the vehicle main body has a perpendicular front surface and an inclined surface fixed to an upper end of the front surface;
a front portion plate shaped member having a rear end portion that is fixed to a lower end portion of the vehicle main body; and
front portion end plates respectively provided at each side of the front portion plate shaped member;
wherein the front portion plate shaped member includes:
a lower portion plate shaped member having a rear end portion that is fixed to a lower end portion of a front surface of the vehicle main body; and an upper portion plate shaped member at a front end portion of the lower portion plate shaped member, the upper portion plate shaped member being coupled turnably relative to the lower portion plate shaped member;
wherein the front portion end plates include first front portion end plates that are provided at each side of the upper portion plate shaped member, and second front portion end plates provided at each side of the lower portion plate shaped member; and
wherein the first and second front portion end plates extend upward, and wherein the first and second front portion end plates are configured to, prevent water from flowing into a front surface of the vehicle main body.

2. The amphibious vehicle according to claim 1, wherein the rear portion end plates extend downward from a lower surface of the rear portion plate shaped member.

3. The amphibious vehicle according to claim 1, wherein the rear portion end plates extend upward from an upper surface of the rear portion plate shaped member.

4. The amphibious vehicle according to claim 3, wherein a distance between the rear portion end plates is greater than a vehicle width of the vehicle main body.

5. The amphibious vehicle according to claim 1, wherein the rear portion end plates include first rear portion end plates extend downward from a lower surface of the rear portion plate shaped member, and second rear portion end plates extend upward from an upper surface of the rear portion plate shaped member.

6. The amphibious vehicle according to claim 1, wherein the front portion end plates extend upward from an upper surface of the front portion plate shaped member.

7. The amphibious vehicle according to claim 1, wherein the front portion plate shaped member has a curved portion at the rear end portion of the front portion plate shaped member.

8. The amphibious vehicle according to claim 1, wherein the front portion plate shaped member is pivotally connected to the vehicle main body around a pivot that connects the front portion plate shaped member to the vehicle main body.

9. The amphibious vehicle according to claim 1, wherein the rear portion plate shaped member is pivotally connected to the vehicle main body around a pivot that connects the rear portion plate shaped member to the vehicle main body.

10. The amphibious vehicle according to claim 1, wherein the front portion plate shaped member is fixable to a front surface of the vehicle main body.

11. The amphibious vehicle according to claim 1, wherein the rear portion plate shaped member is fixable to a rear surface of the vehicle main body.

12. The amphibious vehicle according to claim 1, wherein the rear portion end plates have a shape selected from among a rectangular shape, a triangular shape having a hypotenuse forming a predetermined angle with respect to a direction of water flow, a parallelogram shape, and a trapezoidal shape.

13. An amphibious vehicle comprising:
a vehicle main body that is movable on water and on land;
a rear portion plate shaped member having a front end portion that is fixed to a rear portion of the vehicle main body and having a width corresponding to the width of the vehicle main body;
rear portion end plates respectively provided at each side of the rear portion plate shaped member;
a front portion plate shaped member having a rear end portion that is fixed to a lower end portion of the vehicle main body;
front portion end plates respectively provided at each side of the front portion plate shaped member;
wherein the front portion plate shaped member includes:
a lower portion plate shaped member having a rear end portion that is fixed to a lower end portion of a front surface of the vehicle main body; and
an upper portion plate shaped member at a front end portion of the lower portion plate shaped member, the upper portion plate shaped member being coupled turnably relative to the lower portion plate shaped member;
wherein the front portion end plates include:
first front portion end plates that are provided at each side of the upper portion plate shaped member, and
second front portion end plates provided at each side of the lower portion plate shaped member;
wherein the first and second front portion end plates extend upward, and wherein upper ends of the first and second front portion end plates are not connected to the vehicle main body; and
a second distance between the second front portion end plates is less than a first distance between the first front portion end plates by a distance that is larger than the combined thicknesses of the second front portion end plates.

14. An amphibious vehicle comprising:
a vehicle main body that is movable on water and on land;
a rear portion plate shaped member having a front end portion that is fixed to a rear portion of the vehicle main body and having a width corresponding to the width of the vehicle main body;
rear portion end plates respectively provided at each side of the rear portion plate shaped member;
a front portion plate shaped member having a rear end portion that is fixed to a lower end portion of the vehicle main body; and
front portion end plates respectively provided at each side of the front portion plate shaped member;
wherein the front portion plate shaped member has a curved portion at the rear end portion of the front portion plate shaped member; and
the curved portion is formed along the full width of the rear end portion of the front portion plate shaped member in the direction of the vehicle width of the vehicle main body.

15. The amphibious vehicle according to claim 14, wherein the front portion plate shaped member includes:
a lower portion plate shaped member comprising said curved portion and having a rear end portion that is fixed to a lower end portion of a front surface of the vehicle main body; and
an upper portion plate shaped member at a front end portion of the lower portion plate shaped member, the upper portion plate shaped member being coupled pivotally to the lower portion plate shaped member, and
the curved portion having a radius of curvature of 2/5R to 4/5R, wherein R is a distance between the connection between the vehicle body and the rear end portion of the lower portion plate shaped member and the connection between the lower plate shaped member and the upper portion plate shaped member.

* * * * *